O. P. OSTERGREN & C. D. MOSHER.
STEAM APPARATUS.
APPLICATION FILED MAR. 24, 1914.

1,171,634.

Patented Feb. 15, 1916.
6 SHEETS—SHEET 1.

WITNESSES:

Oscar P. Ostergren
Charles D. Mosher
INVENTORS

BY
Thompson Hill.
ATTORNEY

O. P. OSTERGREN & C. D. MOSHER.
STEAM APPARATUS.
APPLICATION FILED MAR. 24, 1914.

1,171,634.

Patented Feb. 15, 1916.
6 SHEETS—SHEET 2.

Witnesses:
Aug. P. Jungersen
Louise Enderle

Oscar P. Ostergren
Charles D. Mosher
Inventors
By their Attorney
Thomas A. Hill

O. P. OSTERGREN & C. D. MOSHER.
STEAM APPARATUS.
APPLICATION FILED MAR. 24, 1914.

1,171,634.

Patented Feb. 15, 1916.
6 SHEETS—SHEET 5.

WITNESSES:

INVENTORS
Oscar P. Ostergren
Charles D. Mosher
BY
ATTORNEY

O. P. OSTERGREN & C. D. MOSHER.
STEAM APPARATUS.
APPLICATION FILED MAR. 24, 1914.
1,171,634.
Patented Feb. 15, 1916.
6 SHEETS—SHEET 6.
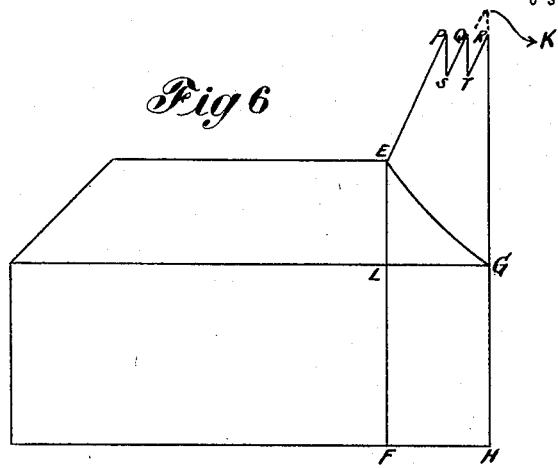
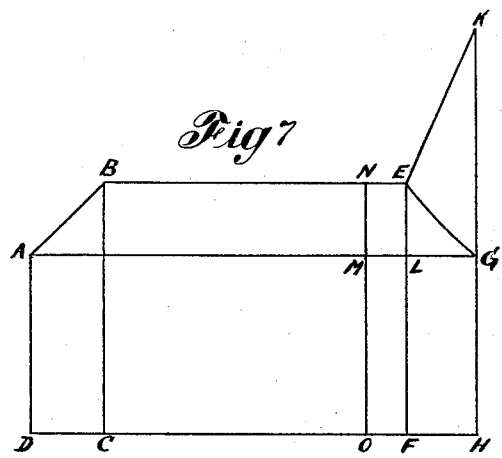
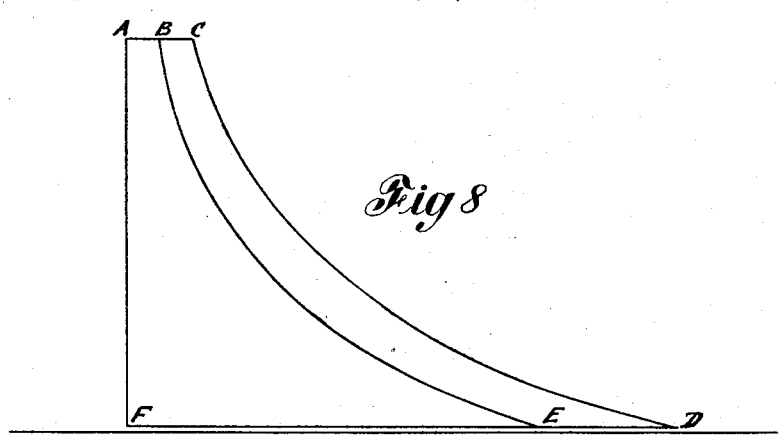
Witnesses:
Oscar P. Ostergren
Charles D. Mosher  Inventor
By their Attorney

UNITED STATES PATENT OFFICE.

OSCAR P. OSTERGREN, OF BROOKLYN, AND CHARLES D. MOSHER, OF NEW YORK, N. Y.

STEAM APPARATUS.

1,171,634.  Specification of Letters Patent.  Patented Feb. 15, 1916.

Application filed March 24, 1914. Serial No. 826,864.

*To all whom it may concern:*

Be it known that we, OSCAR P. OSTERGREN, a subject of the King of Sweden, residing in the borough of Brooklyn, county of Kings and State of New York, and CHARLES D. MOSHER, a citizen of the United States, residing in the borough of Manhattan, in the county of New York and State of New York, have invented certain new and useful Improvements in Steam Apparatus, of which the following is a specification, reference being had therein to the accompanying drawing.

Our invention relates to improvements in the generation and utilization of steam, and is particularly well adapted for and is illustrated in the accompanying drawings in its application to a steam power plant in which a turbine is employed.

Figure 1:
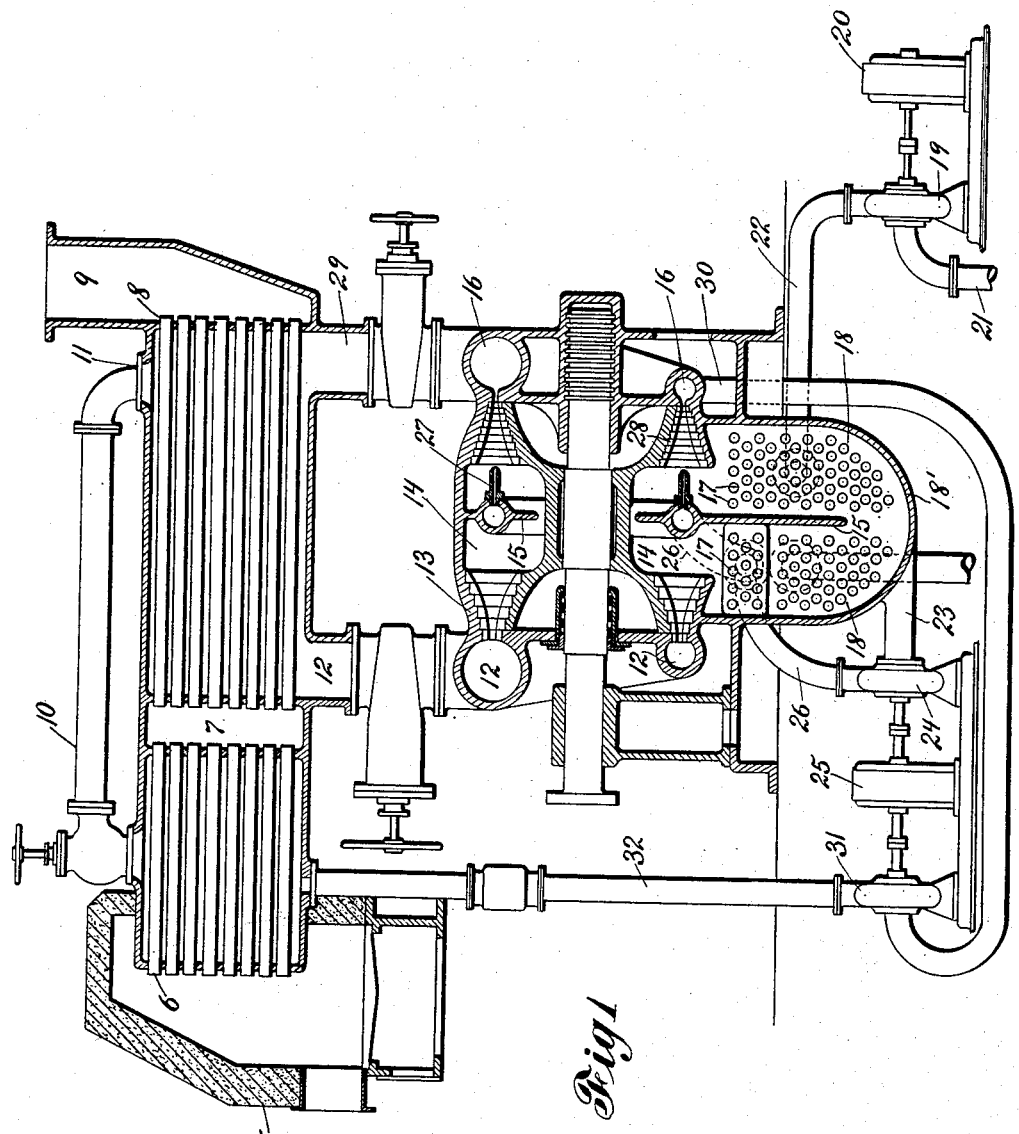
Figure 2:
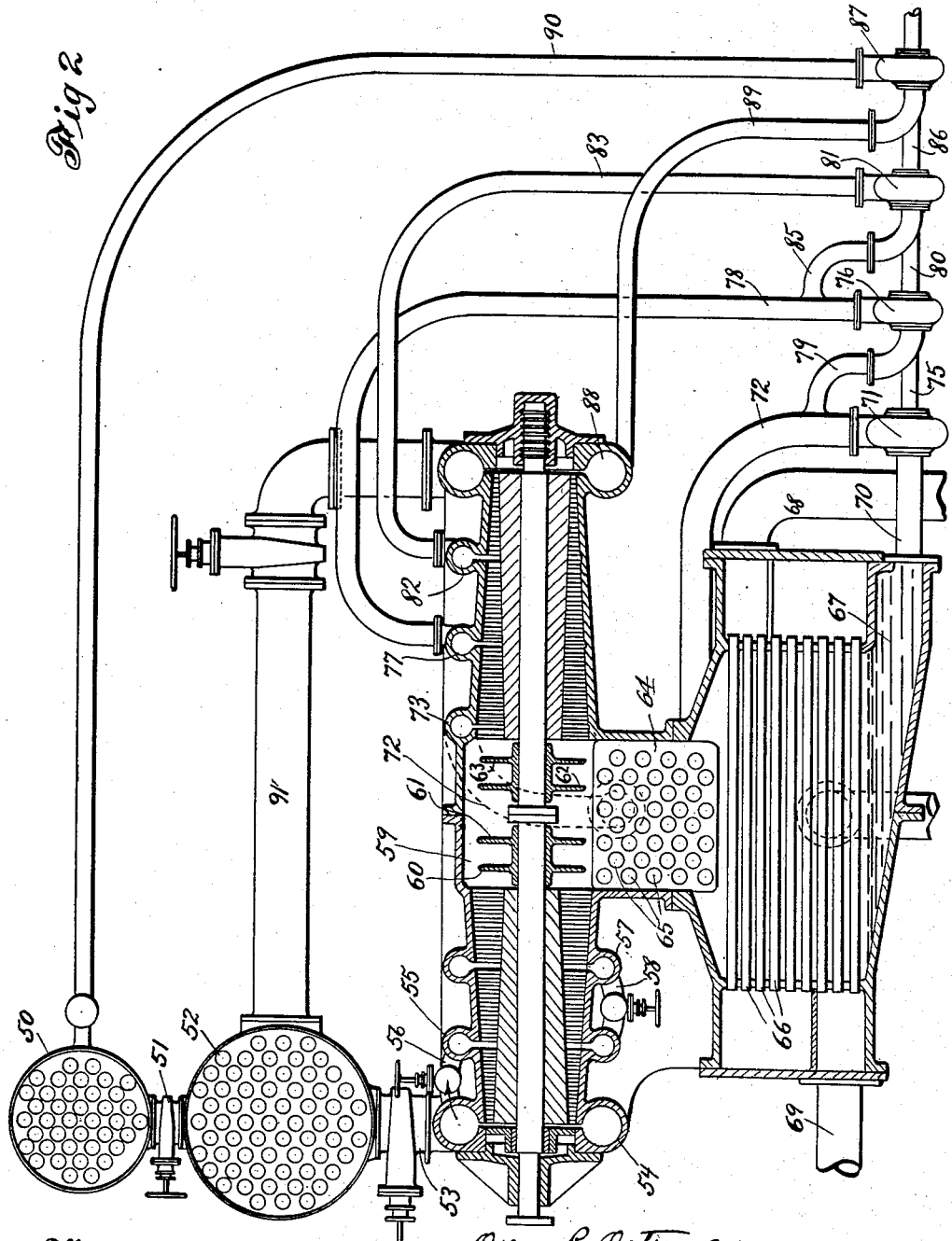
Figure 3:
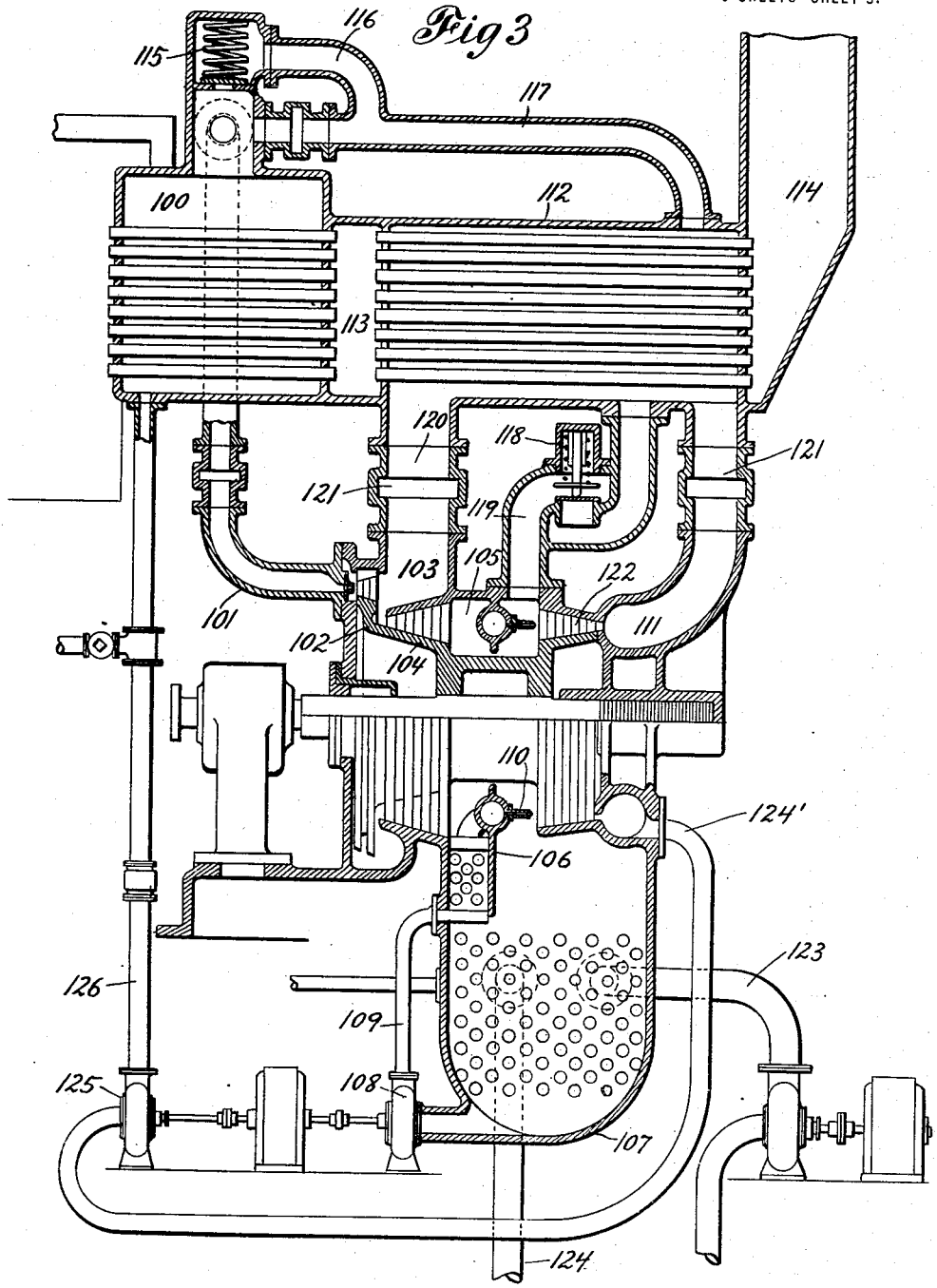
Figure 4:
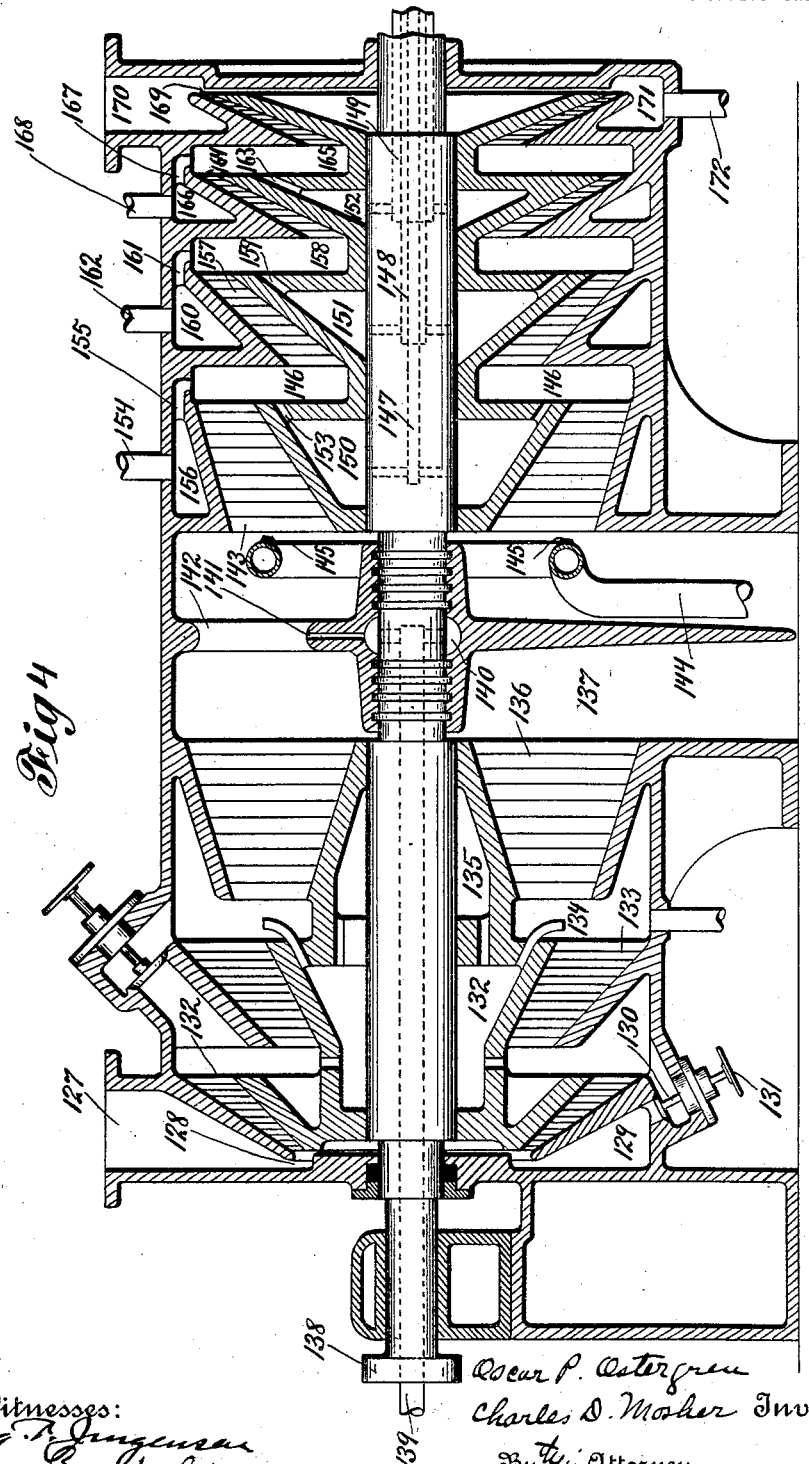

In the accompanying drawings Figure 1 illustrates in side elevation partly in cross section, an application of our invention as aforesaid, and Fig. 2 is a similar view illustrating a modified application of the invention. Fig. 3 is another modification illustrating an application of our invention. Fig. 4 is a modified form of apparatus illustrating another application of our invention, and the same applies to Fig. 5, and Figs. 6, 7 and 8 are steam diaphragms hereinafter more fully referred to.

5 indicates the furnace and 6 the tubular boiler within which the steam is generated.

8 indicates the tubular superheater separated from the boiler by the chamber 7, the exhaust gases from the fuel passing through the tube 6 of the boiler and beyond the passage 7 through the tubes 8 of the superheater into the exhaust flue 9.

The steam generated in the boiler passes through the main 10 into the superheater at 11 as shown and is fed to the turbine 13 by the main 12, passing into the interior of the turbine 14 where it is deflected downwardly by the plate 15—15′ passing beyond the edge of the same and escaping into the outlet 16, the condensed steam dropping down upon the tubes 17 and condenser tubes 18 and accumulating in the bottom of the condenser 18′.

19 is the water circulating pump driven by any suitable means such as the motor 20 and fed by the main 21. This serves to circulate the water through the main 22 through the tubes 18 of the condenser and the condensed steam within the bottom of the condenser 18 is pumped out of the same through the outlet 23 by means of the pump 24 which may be driven by any suitable means such as the motor 25, said condensed steam passing through the pipe 26 into the tubes 17 which feed the same to the injector or nozzle 27 from which point it passes through the end 28 of the turbine into the head 16 from which place it reënters the superheater 8 by the main 29. Any of the hot water not converted after leaving the nozzles 27, it will be readily understood, will drain into the lower end of the header 16 from which point it will pass down through the tube 30 to the pump 31 driven by the motor 25, and from which it is fed through the tube 32 to the boiler where it is again converted as originally. From this it will be seen that the condensed water from the bottom of the condenser in passing through the tubes 17 takes up the heat from the same as it leaves the turbine before that condensed water comes in contact with the condenser tubes 18; thus saving that heat which would otherwise be radiated and lost, and the heat from the exhaust steam within the chamber 14 also combines with the water from the tubes 17 as it is jetted from the nozzle 27, except such water as drains from the bottom of the header 16 which is again returned to the boiler as aforesaid, thus making it possible to preserve the latent heat which would otherwise be lost by condensation.

In the modification shown in Fig. 2 the boiler is indicated by the reference character 50 from which point the steam passes into the superheater 52 through the connection 51 and passes to the turbine through the connection 53, entering by the header 54 which it will be observed is connected to the header 55 by the connection 56, the header 55 being connected with the header 57 by the connection 58 from which point the steam passes through the turbine into the chamber 59 striking the deflectors 60 to 63 inclusive and passing down over the tubes 65 and between the condenser tubes 66 into the bottom of the condenser as shown at 67. The water circulation of course it will be understood is established through the pipe 68, tubes 66 and outlet 69 in the usual manner. The condensed steam after reaching the bottom of the condenser as indicated at 67, is taken off through the pipe 70 and is driven by the pump 71 through the pipe 72 into the top of the header at 73 from which point it drains off from the bottom of the header indicated by the reference character 74 and discharges over the condenser tubes 66 from which point it is again pumped through by the pump 71 as aforesaid. Some of the condensed steam acted upon by the pump 71 in passing through the pipe 72, is taken off by the pipe 79 and pump 76 which feeds the header 77 through the pipe 78, and some of the condensed steam acted upon by the pump 76 in passing through the pipe 85 is taken off by the pump 81 which feeds the header 82 through the pipe 83. Any surplus of condensed steam which has not been absorbed by the steam and consequently deposits in the lower portion of the header 88, will drain through the pipe 89 to the pump 87 from where it is pumped back to the boiler 50 through the pipe 90. The steam after leaving the chamber 59 having done its work in the turbine and in passing through the right hand end of the turbine, it will be observed, encounters the condensed steam which is pumped as aforesaid until the remaining steam emerging into the pipe 88 is highly saturated and returns to the superheater through the main 91. By this means it will be observed that the turbine may be reversed by closing the valve 92 so that the superheated steam enters through the main 91 and after passing through the turbine enters the chamber 59 as aforesaid, passing down over the tubes 55 and 56 into the bottom of the condenser as indicated at 67, from which point the condensed steam is pumped back as aforesaid. Of course when working under reversed conditions it will be appreciated that it will not be so efficient for the reason that the steam will be gradually saturated as it passes through the right side of the turbine.

Referring now to Fig. 3, it will be observed that from the boiler 100 the steam passes through the main 101 and acts upon the impulse wheel 102 from which point it enters the chamber 103 and passes through the turbine 104 into the chamber 105 where, after doing its work, the condensed steam passes down over the tubes 106 of the preheater into the condenser 107 from which point part of the condensed steam may be forced up by the pump 108 through the pipe 109 and out of the nozzle 110 where it mixes with the condensed steam and passes into the outlet 111 from which point it goes into the superheater 112. The heat from the furnace it will of course be understood passes between the boiler tubes and through the chamber 113 through the tubes of the superheater out of the stack 114, and it will be further understood that 115 indicates a suitable safety valve upon the boiler which allows any excess of steam therefrom to pass through the mains 116 and 117 into the superheater as shown, and any excess pressure in the superheater it will also be observed causes the safety valve 118 to operate, thus allowing the steam to enter the chamber 105 through the connection 119 allowing the superheated steam to mix with the condensed steam so as to be returned to the superheater as aforesaid. The valve 120 it will be observed may be adjusted by the valve 121 so as to admit a predetermined amount of steam from the superheater to mix with the expanded steam from the boiler after the same has acted upon the impulse wheel 102. For the purpose of reversing it will of course be understood that the valve 120 may be closed and the valve 121 may be opened, thus allowing steam to enter the turbine at 122 which previously served as a compressor. 123—124 indicates any suitable water circulating system. Any unabsorbed condensed steam after leaving the jet or nozzle 110 will be taken up through the pipe 124' and by means of the pump 125 will be returned through the main 126 into the boiler 100.

Referring to Fig. 4, 127 indicates an inlet for the superheated steam which passes through the passage 128 entering the chamber 129 and from which point it may pass into the chamber 130 beyond the valve 131 in amount according to adjustment. The steam which does not enter the chamber 130 past the valve 131 acts upon the turbine 132 in entering the chamber 130 and in its expanded form is there mixed with the steam which enters by the valve 131. This mixed steam then passes, part of it into the chamber 132, and part of it through the turbine 133, mixing in the chamber 134, part of it also entering the chamber 135 where it heats the metal in contact. The steam within the chamber 134 then passes through the turbine 136 into the chamber 137. 138 indicates the main shaft of the turbine which it will be observed is hollow and is provided with the water pipe 139 which feeds the chamber 140 and from which the water is emitted into the chamber 137 by the nozzles 141 in the form of a sheet. The expanded steam entering the chamber 137 from the turbine 136 in passing through the opening 142 is saturated with the sheet of water therein. Some of this steam is condensed and passes to the condenser while the saturated steam enters the compressor 143. From the condenser the water passes over the superheater and is returned by the tube 144 and jets or nozzles such as 145, so that the steam and water are mixed in entering the compressor 143 from which point they are forced into the chamber 146. 147—148 and 149 are concentric tubes supplying water to the interior of the shaft 138 and from which the water is fed into the chambers 150—151 and 152 respectively. As the partly saturated steam enters the chamber 146, it mixes with the water passing from the chamber 150 through the opening 153 and any surplus water is taken off by the pipe 154 through the opening 155 and chamber 156, or of course it will be understood that the water may be fed through the pipe 154, chamber 156, and passage 155 to the chamber 146. From the chamber 146 the further saturated steam passes through the compressor 157 into the chamber 158 where it receives a further saturation from the water passing from the chamber 151 through the inlet 159 and the surplus water is also taken from the chamber 160 by the passage 161 and through the tube 162. Again the further saturated steam passes into the chamber 163 from the compressor 164 where it is further mixed with water from the chamber 152 entering through the passage 165 and from which chamber 163 surplus water passes into the chamber 166 by the passage 167 and returns to the condenser in the usual way by the pipe 168. From the last mentioned chamber 163, the remaining almost completely saturated steam passes through the compressor 169 and from there passes to the superheater through the main 170 allowing any free water or condensed steam to escape from the passage 171 through the pipe 172, back to the boiler.

Figure 5:
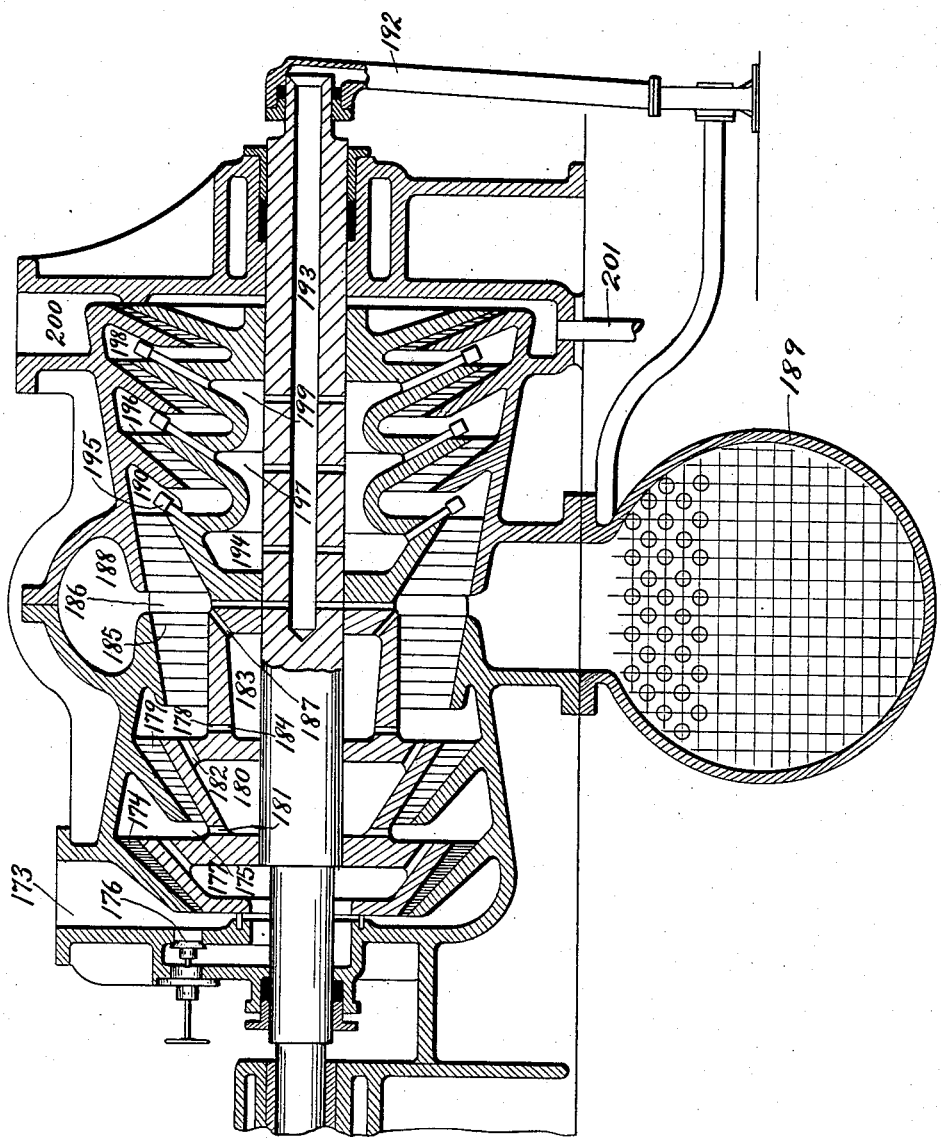

In the modification shown in Fig. 5, the superheated steam enters through the main 173 passing through the turbine 174 into the chamber 175, part of the superheated steam passing beyond the valve 176 and entering the chamber 177 as shown where it mixes in the chamber 175 with the expanded steam from the turbine 174. From the chamber 175 the steam passes into the chamber 178 through the turbine 179, part of said steam passing into the chamber 180 through the port 181, and enters the said chamber 178 through the port 182 from the chamber 178, part of the steam enters the chamber 183 by the port 184 and part passes through the turbine 185 to the vanes 186, some of the steam also passing to the vanes 186 through the port 187. From the vanes 186 the steam is whirled in the chamber 188, some of it condensing within the condenser 189 and the uncondensed remaining steam passing into the chamber 190 by the action of the compressor 191. 192 indicates the water inlet which it will be observed passes through the center of the shaft as shown at 193 where it mixes with the steam as it is whirled by the vanes 186, so that the steam entering the chamber 190 is somewhat saturated. It will also be observed that water enters the chamber 194 where it passes beyond the valve 195 which is released by centrifugal force according to the tension of its adjustment, so that the slightly saturated steam in the chamber 190 is further saturated by the water entering from the chamber 194. As the steam passes through the compressor 196, it is further saturated from the water within the chamber 197 and as it passes into the chamber 198 it is also further saturated from the water within the chamber 199 until finally the saturated steam passes through the main 200 allowing the condensed steam to be returned to the boiler from the drain pipe 201.

On referring to the diagrams shown in Figs. 6, 7 and 8, and with particular reference to Fig. 7, it will be observed that if the line A—D represents the absolute temperature of the water in a condenser, say about 562 degrees (101 degrees F.) corresponding to 1 pound absolute pressure per square inch area and heat be added to said water in a boiler up to the temperature of the latter, the horizontal distance C—D should be made such that the area A B C D represents the amount of heat thus added. Now, if more heat is added to the water along the isothermal line B—E until at E all of it has been evaporated, the area B E F C should correspond to the amount of heat added for said purpose and converted into latent heat. If this steam is then allowed to expand in an engine performing work and it is desired that the expansion should take place without condensation in the cylinder or along the saturation curve to G, heat would have to be added corresponding to the area E G H F. Now, if all the latent heat in the steam is removed in the condenser at a constant temperature (101 degrees F.) along the isothermal G—A we arrive back at point A and the cycle is closed. The area A B E G H D A represents all the heat thus put into the water, while the area A B E G A represent the heat convertible into work in the ordinary steam engine. Again, if from E the steam is led through a superheater and the temperature is raised along line E—K to K and then expanded adiabatically in the engine without adding or deducting heat except through transformation into work the temperature will fall along the vertical line K—G to G where, contingent of the location of point K, it should intersect the saturation curve E—G at the condenser temperature at G. From G the heat is removed in the condenser along line G—A as before. In this case, the area A B E K H D A represents the total amount of heat added to the water and the area A B E K G A the heat which was convertible into work. While these two cases illustrate what proportion of the total heat put into the steam can be converted into work in the usual steam engine of the present day, they are set forth for the purpose of comparison in order to more thoroughly illustrate the scope and manner of improvement in our new cycle as represented by E K G L E, Fig. 7. In this cycle we may assume that water is already converted into saturated steam and beginning at E we add heat as before along line E—K and as before the steam is expanded in an engine adiabatically performing work while the temperature drops along line K—G to G. Now, this steam could be mechanically compressed to its original pressure on several and different thermal lines. It could either be compressed adiabatically (without adding or deducting heat when the temperature would raise along line G—K, in which case no heat would be converted into external work, as illustrated in the compression period of a common reciprocating engine diagram), or compression may take place during elimination of some heat i. e. so that the temperature increased along the saturation curve G. E up to E when the area E K G E would represent the amount of heat convertible into work from a total input as represented by the area E K H F E. Or a certain amount of the heat may be extracted in a condenser along line G—L to L allowing the remaining steam to be compressed and utilizing the condensated steam (water) to be introduced in the compression in the form of a spray so that it is gradually vaporized by the heat created through compression without adding or deducting heat from or to the outside. The temperature of the mixture will increase along line L—E to E; all the fluid being thus restored in the form of saturated steam at its original pressure. The area E K G L E represents here the proportion of heat convertible into work from a total input as represented by the area E K H F E and is the largest proportion attainable within the temperature limits of the cycle. Finally, a larger proportion of the steam may be condensed than that which can be converted back to steam from the heat evolved in the compressor as in the preceding case i. e. along line G—A to M. In this case, the temperature of all the mixture can be brought up to line B E by means of compression only if enough of steam is left for compression with this end in view. In any case, some of the mixture will remain in liquid shape and must as such be converted to steam in a boiler in which heat is added along the isothermal line from N to E. The proportion of heat convertible into work in this case is represented by area N E K G M N from a total input proportional to area N K H O N. It will be seen that while the power of a given motor (disregarding the necessary addition of boiler and extension of condenser) can be increased the thermal efficiency is gradually decreased as conditions approach those of the ordinary steam engine.

In Fig. 6, E K G L E represents the cycle when the original pressure of the steam is very high and as a consequence line L—G so extended that it would be impractical to superheat the steam sufficiently in one stage (to K) that line K G would intersect the saturation line a G. In this case intermediate heating is resorted to i. e. from S to Q and T to R, etc. Said reheating may be accomplished by direct adding of superheated steam between the stages of the motor as shown in the drawing or by means of tubular reheaters in the usual manner. The proportion of heat convertible into work in this case is represented by the area E P S Q T R G L E from a total input represented by area E P S Q T R H F E. In all other respects this case is subject to the heretofore described consideration. The cycle may also be illustrated by means of the pressure-volume diagram, Fig. 8, where line A—B represents a certain volume of saturated steam of pressure A—F. This volume is increased by superheating to C from C the gas is allowed to expand adiabatically down to D while performing work in a motor, the volume has then become F—D. From D a certain portion of this volume is condensed isothermally to E. From E the remaining portion E—F is compressed along the saturation line E—B during which process the condensate just created is absorbed by the steam as heretofore described. At B the cycle is closed and renewed as before. It is plain that the positive work performed by the steam in the motor is proportional to the area A C D F A and the negative work of the compressor to the area A B E F A leaving area B C D E B as net or external work.

Referring again to Fig. 5, it will be understood that it is desirable to keep the space 186 between the turbine blades and the compressor blades as short as possible so that by the assistance of the guide blades between the turbine and the compressor the velocity of the steam as it leaves the turbine blades will be retained as it enters the compressor.

Of course it will be understood that various modifications may be made without departing from the spirit of the invention as claimed.

We claim:

1. A heat engine comprising means for converting heat into work by expanding gas, means for adding heat to said expanding gas in the engine, means for cooling said gas and compressing it to its original pressure, means for lowering the temperature during said compression, and means for raising the temperature to its original point.

2. The method of utilizing steam for power purposes consisting in generating steam from water, superheating the said steam, converting its expansive properties into energy, condensing a portion of the expanded steam into water, and feeding the said condensate together with the uncondensed expanded steam back into said superheater.

3. The method of utilizing steam for power purposes consisting in generating steam from water, superheating the said steam, converting its expansive properties into energy, condensing a portion of the expanded steam into water, and feeding the said condensate together with the uncondensed expanded steam back into said superheater, and means for heating said condensate prior to mixing the same with said uncondensed steam.

4. The method of utilizing steam for power purposes consisting in generating steam from water, superheating the said steam, converting its expansive properties into energy, condensing a portion of the expanded steam into water, and feeding the said condensate together with the uncondensed expanding steam back into said superheater, and means for heating said condensate prior to mixing the same with said uncondensed steam, by a portion of the heat of said condensate prior to its mixture with said uncondensed steam.

5. The method of utilizing steam for power purposes consisting in generating steam from water, superheating the said steam, converting its expansive properties into energy, condensing a portion of the expanded steam into water, and mixing said condensate with said uncondensed expanded steam and forcing the same back into said superheater.

6. The method of utilizing steam for power purposes consisting in generating steam from water, superheating the said steam, converting its expansive properties into energy, reheating the expanded steam, and again converting its expansive properties into energy, condensing a portion of the expanded steam into water, and feeding the said condensate together with the uncondensed expanded steam back into said superheater.

7. The method of utilizing steam for power purposes consisting in generating steam from water, superheating the said steam, converting its expansive properties into energy, reheating the expanded steam, and again converting its expansive properties into energy, condensing a portion of the expanded steam into water, and feeding the said condensate together with the uncondensed expanded steam, into a succession of compressors and thence into the superheater.

8. The method of utilizing steam for power purposes consisting in generating steam from water, superheating the said steam, converting its expansive properties into energy, reheating the expanded steam, and again converting its expansive properties into energy, condensing a portion of the expanded steam into water, and feeding the said condensate together with the uncondensed expanded steam into a succession of compressors and thence into the superheater, and means for returning to the boiler any condensate not returned to the superheater.

9. The method of utilizing steam for power purposes consisting in generating steam from water, converting its expansive properties into energy, and simultaneously therewith superheating steam at a lower pressure, mixing said superheated and expanded steam, and converting the expansive properties of said mixed steam into energy, condensing a portion of the expanded steam into water, and feeding said condensate together with the uncondensed expanded steam back in the superheater.

10. In a steam power apparatus, a motor and a compressor, means for feeding fluid through said motor and into said compressor, and means for reversing the flow of said fluid and the action of said compressor.

In testimony whereof we hereunto affix our signatures in the presence of two witnesses.

OSCAR P. OSTERGREN.
CHARLES D. MOSHER.

Witnesses:
LOUISE ENDERLE,
THOMAS A. HILL.

Copies of this patent may be obtained for five cents each, by addressing the "Commissioner of Patents, Washington, D. C."